US008914750B2

(12) United States Patent
Howard et al.

(10) Patent No.: US 8,914,750 B2
(45) Date of Patent: Dec. 16, 2014

(54) USER DEFINED SCENARIOS IN A THREE DIMENSIONAL GEO-SPATIAL SYSTEM

(75) Inventors: Richard D. Howard, Kentfield, CA (US); Jarrod Lopiccolo, Carson City, NV (US); Grant Anderson, Reno, NV (US); Roy Lindauer, Reno, NV (US); Thomas Helman, Valencia, CA (US); Matthew Larsen, Gardnerville, NV (US)

(73) Assignee: Autodesk, Inc., San Rafael, CA (US)

( * ) Notice: Subject to any disclaimer, the term of this patent is extended or adjusted under 35 U.S.C. 154(b) by 1451 days.

(21) Appl. No.: 12/245,562

(22) Filed: Oct. 3, 2008

(65) Prior Publication Data

US 2009/0094556 A1   Apr. 9, 2009

Related U.S. Application Data

(60) Provisional application No. 60/997,868, filed on Oct. 5, 2007.

(51) Int. Cl.
*G06F 3/048* (2013.01)
*G06G 7/56* (2006.01)
*G06T 19/00* (2011.01)
*G06F 17/30* (2006.01)
*G06T 17/05* (2011.01)

(52) U.S. Cl.
CPC .......... *G06F 17/30241* (2013.01); *G06T 19/00* (2013.01); *G06T 17/05* (2013.01)
USPC .............................................. 715/848; 703/5

(58) Field of Classification Search
USPC ....................................................... 715/848
See application file for complete search history.

(56) References Cited

U.S. PATENT DOCUMENTS

| | | | |
|---|---|---|---|
| 5,148,154 A | 9/1992 | MacKay et al. | |
| 5,226,109 A | 7/1993 | Dawson et al. | |
| 5,295,243 A | 3/1994 | Robertson et al. | |
| 5,461,709 A | 10/1995 | Brown | |
| 5,473,747 A | 12/1995 | Bird et al. | |
| 5,767,854 A | 6/1998 | Anwar | |
| 5,767,855 A | 6/1998 | Bardon et al. | |
| 5,999,165 A | 12/1999 | Matsumoto | |
| 6,018,350 A | 1/2000 | Lee et al. | |
| 6,147,686 A * | 11/2000 | Brown et al. | 715/839 |
| 6,339,429 B1 | 1/2002 | Schug | |

(Continued)

OTHER PUBLICATIONS

PCT/US2008/78797 International Search Report and Written Opinion, Dec. 10, 2008.

(Continued)

*Primary Examiner* — Stephen Alvesteffer
(74) *Attorney, Agent, or Firm* — Gates & Cooper LLP (57) ABSTRACT

A method, apparatus, and article of manufacture provide the ability to store user defined scenarios in a three-dimensional system. A 3D view of a real world scene is displayed, using a three-dimensional (3D) graphics application. Plug-ins are installed into the 3D graphics application. A user selects a subset of the plug-ins, defines settings for the subset of plug-ins, and defines a visualization trait for each plug-in in the subset. The user associates an identification of the selected subset, the settings, and the visualization trait with a scenario bookmark that is saved. The bookmark can be selected by a user to display a visualization of a scenario based on the selected subset, settings, and visualization trait.

24 Claims, 7 Drawing Sheets

(56) References Cited

U.S. PATENT DOCUMENTS

| | | | |
|---|---|---|---|
| 6,915,310 B2 * | 7/2005 | Gutierrez et al. | 707/769 |
| 6,950,791 B1 * | 9/2005 | Bray et al. | 703/22 |
| 7,058,896 B2 | 6/2006 | Hughes | |
| 7,170,510 B2 | 1/2007 | Kawahara et al. | |
| 7,181,362 B2 | 2/2007 | Ratti et al. | |
| 7,263,667 B1 | 8/2007 | Hoellerer et al. | |
| 7,528,938 B2 | 5/2009 | Garceau et al. | |
| 7,567,844 B2 | 7/2009 | Thomas et al. | |
| 7,693,702 B1 * | 4/2010 | Kerner et al. | 703/22 |
| 7,710,418 B2 | 5/2010 | Fairclough | |
| 7,856,312 B2 | 12/2010 | Coombes et al. | |
| 7,865,836 B1 * | 1/2011 | Sperlongano et al. | 715/771 |
| 7,933,395 B1 * | 4/2011 | Bailly et al. | 379/201.04 |
| 2003/0057887 A1 | 3/2003 | Dowling et al. | |
| 2003/0164827 A1 * | 9/2003 | Gottesman et al. | 345/419 |
| 2005/0091596 A1 | 4/2005 | Anthony et al. | |
| 2005/0110788 A1 | 5/2005 | Turner et al. | |
| 2005/0190199 A1 * | 9/2005 | Brown et al. | 345/600 |
| 2005/0223337 A1 * | 10/2005 | Wheeler et al. | 715/806 |
| 2006/0075356 A1 * | 4/2006 | Faulkner et al. | 715/782 |
| 2006/0176303 A1 | 8/2006 | Fairclough | |
| 2006/0209061 A1 | 9/2006 | Burch et al. | |
| 2007/0132779 A1 * | 6/2007 | Gilbert et al. | 345/619 |
| 2007/0143345 A1 * | 6/2007 | Jones et al. | 707/104.1 |
| 2007/0150198 A1 | 6/2007 | MacDonald | |
| 2007/0176926 A1 | 8/2007 | Garcia et al. | |
| 2007/0219645 A1 | 9/2007 | Thomas et al. | |
| 2007/0276901 A1 * | 11/2007 | Glinsky et al. | 709/203 |
| 2008/0016472 A1 * | 1/2008 | Rohlf et al. | 715/848 |
| 2008/0140271 A1 | 6/2008 | Garceau et al. | |
| 2008/0215414 A1 * | 9/2008 | Fehnel et al. | 705/10 |
| 2008/0215415 A1 | 9/2008 | Willms | |
| 2008/0292213 A1 * | 11/2008 | Chau | 382/294 |
| 2009/0019366 A1 * | 1/2009 | Abhyanker | 715/706 |
| 2009/0254912 A1 * | 10/2009 | Roundtree et al. | 718/102 |
| 2010/0164974 A1 | 7/2010 | Fairclough | |
| 2011/0279470 A1 | 11/2011 | Fairclough | |

OTHER PUBLICATIONS

Clausters, Luc; Romain, Cyril; Sanchez, David; 9. Interactive Authoring of Interactive Stories, Datasheet [online], inScape storytelling, Feb. 2006, version 2.0 (retrieved on Nov. 20, 2008). Retrieved from the Internet: <URL: http://www.inscapers.com/pdfs/9_authoring.pdf>, pp. 173-182, 184, 185.

Kie et al., "New MS-Windows-based educational software for teaching the sunpath diagram and shading mask protractor," Conference Proceedings (online), 1996, retrieved from the internet on Nov. 24, 2008, http://repository.tamu.edu/bitstream/handle/1969.1/6694/ESL-HH-96-05-30.pdf?sequence=1.

International Search Report dated Dec. 5, 2008, International application No. PCT/US08/78795, International filed Oct. 3, 2008.

Oh, John Kie Whan; Haberl, Jeff S.; "New MS-Windows-Based Educational Software for Teaching the Sunpath Diagram and Shading Mask Protractor". Energy Systems Laboratory, Department of Architecture, Texas A&M University, College Station; May 13-14, 1996; pp. 262-268.

Office Action of U.S. Appl. No. 12/286,911 mailed Jun. 10, 2011.

Amendment Under 37 C.F.R. 1.111 of U.S. Appl. No. 12/286,911 e-filed Sep. 12, 2011.

Bier et al., "Toolglass and Magic Lenses: The See-Through Interface", 1993—Cited by 1066—Related articles, Xerox PARC, 3333 Coyote Hill Road, Palo Alto, CA 94304, University of Toronto, University of Washington.

Office Action dated Apr. 5, 2012 from related U.S. Appl. No. 12/286,911.

International Search Report and Written Opinion mailed Dec. 11, 2008 for international application No. PCT/US2008/078821.

* cited by examiner

USER DEFINED SCENARIOS IN A THREE DIMENSIONAL GEO-SPATIAL SYSTEM

CROSS-REFERENCE TO RELATED APPLICATIONS

This application claims the benefit under 35 U.S.C. Section 119(e) of the following commonly-assigned U.S. provisional patent application(s), which is/are incorporated by reference herein:

Provisional Application Ser. No. 60/997,868, filed Oct. 5, 2007, by RICHARD D. HOWARD, JARROD LOPICCOLO, GRANT ANDERSON, ROY LINDAUER, THOMAS HELMAN, and MATTHEW LARSEN, entitled "FRAMEWORK FOR AGGREGATING DESIGN MODELS AND GIS DATA IN A GEOSPATIAL ENVIRONMENT,"

This application is related to the following co-pending and commonly-assigned patent application, which application is incorporated by reference herein:

U.S. patent application Ser. No. 12/245,568, entitled "SUN-SHADOW SIMULATION IN A GEOSPATIAL SYSTEM", by Richard D. Howard, filed on Oct. 3, 2008; and U.S. patent application Ser. No. 12/286,911, entitled "VIEWPORT OVERLAYS TO EXPOSE ALTERNATE DATA REPRESENTATIONS", by Richard D. Howard, filed on Oct. 3, 2008.

BACKGROUND OF THE INVENTION

1. Field of the Invention

The present invention relates generally to three-dimensional (3D) applications, and in particular, to a method, apparatus, and article of manufacture for a framework for aggregating design models and geographic information system (GIS) data within an immersive 3D geospatial environment (i.e., a digital city). Further, the invention provides the ability for a user to define a scenario in a 3D geo-spatial system.

2. Description of the Related Art

Geographic information systems (GIS) are commonly used and generally refer to an information system that integrates hardware, software and data in order to capture, store, analyze, manage, and display/present data that is spatially referenced (i.e., linked to location or is geographically referenced). GIS systems commonly provide a two dimensional (2D) visualization of data in the form of maps, globes, reports, and charts. However, prior art GIS systems fail to provide the capability to merge GIS data with additional information in order to visualize, analyze, and simulate trends, phenomena, states, and events. Further, three-dimensional (3D) systems also fail to provide such capabilities.

In addition, prior art systems fail to provide the ability for a user to easily establish a defined scenario using a set of plug-ins and settings for such plug-ins. Accordingly, the user has no mechanism to easily compare, contrast, and/or simulate a desired scenario and is respective visualization in a three-dimensional/four-dimensional manner.

SUMMARY OF THE INVENTION

To overcome the problems of the prior art, embodiments of the invention allow users to define "what-if" scenarios using a type of visual bookmarking. Each scenario captures specific model and linked data overrides supplied by the user, a set of plug-ins and their settings, and visualization parameters and traits.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

Overview

One or more embodiments of the invention provide an application and development framework for aggregating design models and GIS data within an immersive 3D geospatial environment for the purposes of visualizing, analyzing, and simulating trends, phenomena, state, and events in ways that are not possible within conventional 2D GIS or existing 3D application software. In other words, embodiments of the invention provide the ability to view, analyze, simulate trends, phenomena, states, and events in a digital city.

The benefits of the embodiments of the invention include:

3D Geospatial Environment containing both simplified and fully textured rendition based on high resolution lidar and ortho-photography for content such as Digital Terrain Models, Streets and Roadways, Water Features, Railways, Buildings, Utility Infrastructure, and Street Furniture;

Importation, storage, and data mapping of full 3D design models from various software (e.g., software available from the assignee of the present invention including AutoCAD™, Map3D™, Revit™, Architecture™, Civil3D™, and Inventor™, as well as support for GIS formats via Autodesk™ Feature Data Objects (FDO)™ technology);

Real-time 3D rendering and animation including transparency, reflections, lights, shadows, and atmospheric effects;

Smooth motion control and 6-axis navigation;

Object visibility, stylization, and transparency for all content;

Linking to tabular information and ODBC data sources;

Ability to apply local override of any model, data, or visualization attribute or setting;

A plug-in architecture for analysis and simulation modules;

An online catalog that provides search, download, and immediate use of models, data, and plug-ins;

"What If" scenario creation using a combination of models, data, plug-ins, and overrides;

Tabular reports and charting of data values; and

Publishing of specific scenarios for viewing on the web.

Hardware and Software Environment

Figure 1:
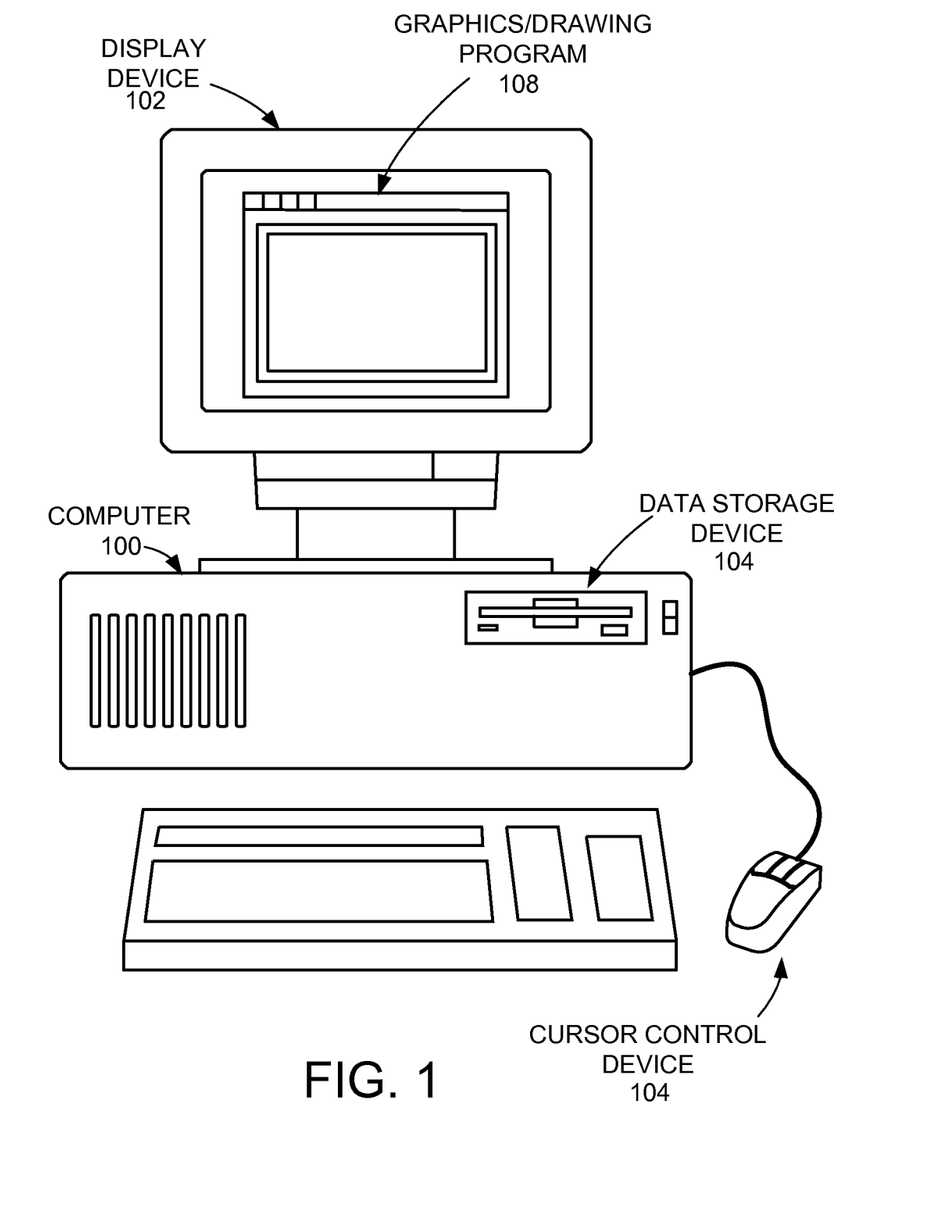
FIG. 1 is an exemplary hardware and software environment used to implement one or more embodiments of the invention.

FIG. 1 is an exemplary hardware and software environment used to implement one or more embodiments of the invention. Embodiments of the invention are typically implemented using a computer 100, which generally includes, inter alia, a display device 102, data storage devices 104, cursor control devices 106, and other devices. Those skilled in the art will recognize that any combination of the above components, or any number of different components, peripherals, and other devices, may be used with the computer 100.

One or more embodiments of the invention are implemented by a computer-implemented graphics program 108, wherein the graphics program 108 is represented by a window displayed on the display device 102. Generally, the graphics program 108 comprises logic and/or data embodied in or readable from a device, media, carrier, or signal, e.g., one or more fixed and/or removable data storage devices 104 connected directly or indirectly to the computer 100, one or more remote devices coupled to the computer 100 via a data communications device, etc.

In one or more embodiments, instructions implementing the graphics program 108 are tangibly embodied in a computer-readable medium, e.g., data storage device 104, which could include one or more fixed or removable data storage devices, such as a zip drive, floppy disc drive, hard drive, CD-ROM drive, DVD drive, tape drive, etc. Further, the graphics program 108 is comprised of instructions which, when read and executed by the computer 100, causes the computer 100 to perform the steps necessary to implement and/or use the present invention. Graphics program 108 and/or operating instructions may also be tangibly embodied in a memory and/or data communications devices of computer 100, thereby making a computer program product or article of manufacture according to the invention. As such, the terms "article of manufacture" and "computer program product" as used herein are intended to encompass a computer program accessible from any computer readable device or media.

Figure 2:
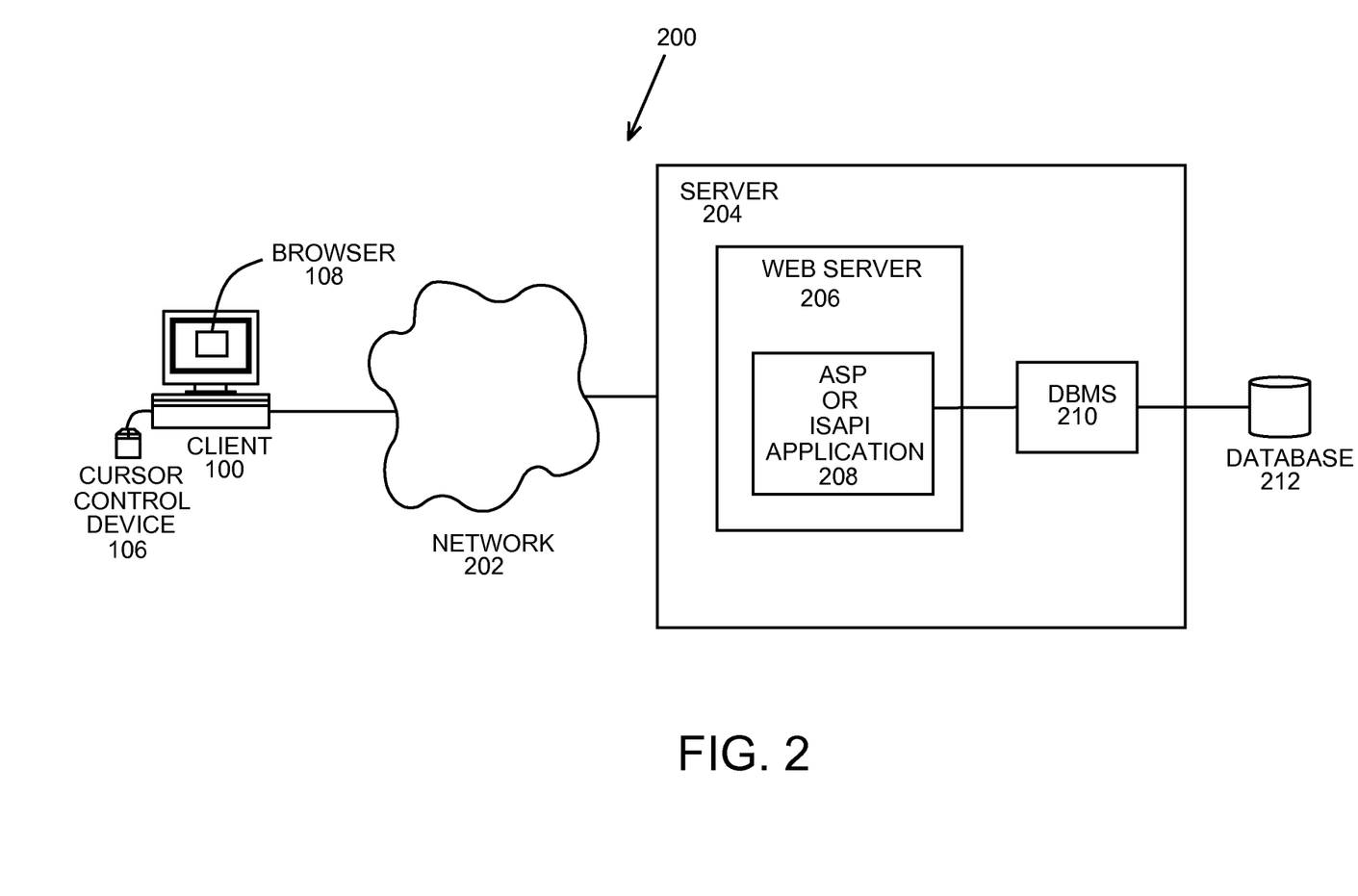
FIG. 2 schematically illustrates a further hardware and software environment in accordance with one or more embodiments of the invention.

FIG. 2 schematically illustrates a further hardware and software environment in accordance with one or more embodiments of the invention, and more particularly, illustrates a typical distributed computer system 200 using a network 202 to connect client computers 100 to server computers 204. A typical combination of resources may include a network 202 comprising the Internet, LANs (local area networks), WANs (wide area networks), SNA (systems network architecture) networks, or the like, clients 100 that are personal computers or workstations (e.g., as described above), and servers 204 that are personal computers, workstations, minicomputers, or mainframes. Additionally, both client 100 and server 204 may receive input (e.g., cursor location input) and display a cursor in response to an input device such as cursor control device 106.

A network 202 such as the Internet connects clients 100 to server computers 204. Additionally, network 202 may utilize radio frequency (RF) to connect and provide the communication between clients 100 and servers 204. Clients 100 may execute a client application or Web browser 108 (e.g., as described above) and communicate with server computers 204 executing Web servers 206. The software executing on clients 100 may be downloaded from server computer 204 to client computers 100 and installed as a plug in or ActiveX control of a Web browser. Accordingly, clients 100 may utilize ActiveX components/component object model (COM) or distributed COM (DCOM) components to provide a user interface on a display of client 100.

Web server 206 may host an Active Server Page (ASP) or Internet Server Application Programming Interface (ISAPI) application 208, which may be executing scripts. The scripts invoke objects that execute business logic (referred to as business objects). The business objects then manipulate data in database 212 through a database management system (DBMS) 210. Alternatively, database 212 may be part of or connected directly to client 100 instead of communicating/obtaining the information from database 212 across network 202. When a developer encapsulates the business functionality into objects, the system may be referred to as a component object model (COM) system. Accordingly, the scripts executing on web server 206 (and/or application 208) invoke COM objects that implement the business logic. Further, server 204 may utilize Microsoft's Transaction Server (MTS)™ to access required data stored in database 212 via an interface such as ADO (Active Data Objects), OLE DB (Object Linking and Embedding DataBase), or ODBC (Open DataBase Connectivity).

Those skilled in the art will recognize many modifications may be made to this exemplary environment without departing from the scope of the present invention. For example, those skilled in the art will recognize that any combination of the above components, or any number of different components, including different logic, data, different peripherals, and different devices, may be used to implement the present invention, so long as similar functions are performed thereby.

Computer-Implemented Graphics Program

Figure 3:
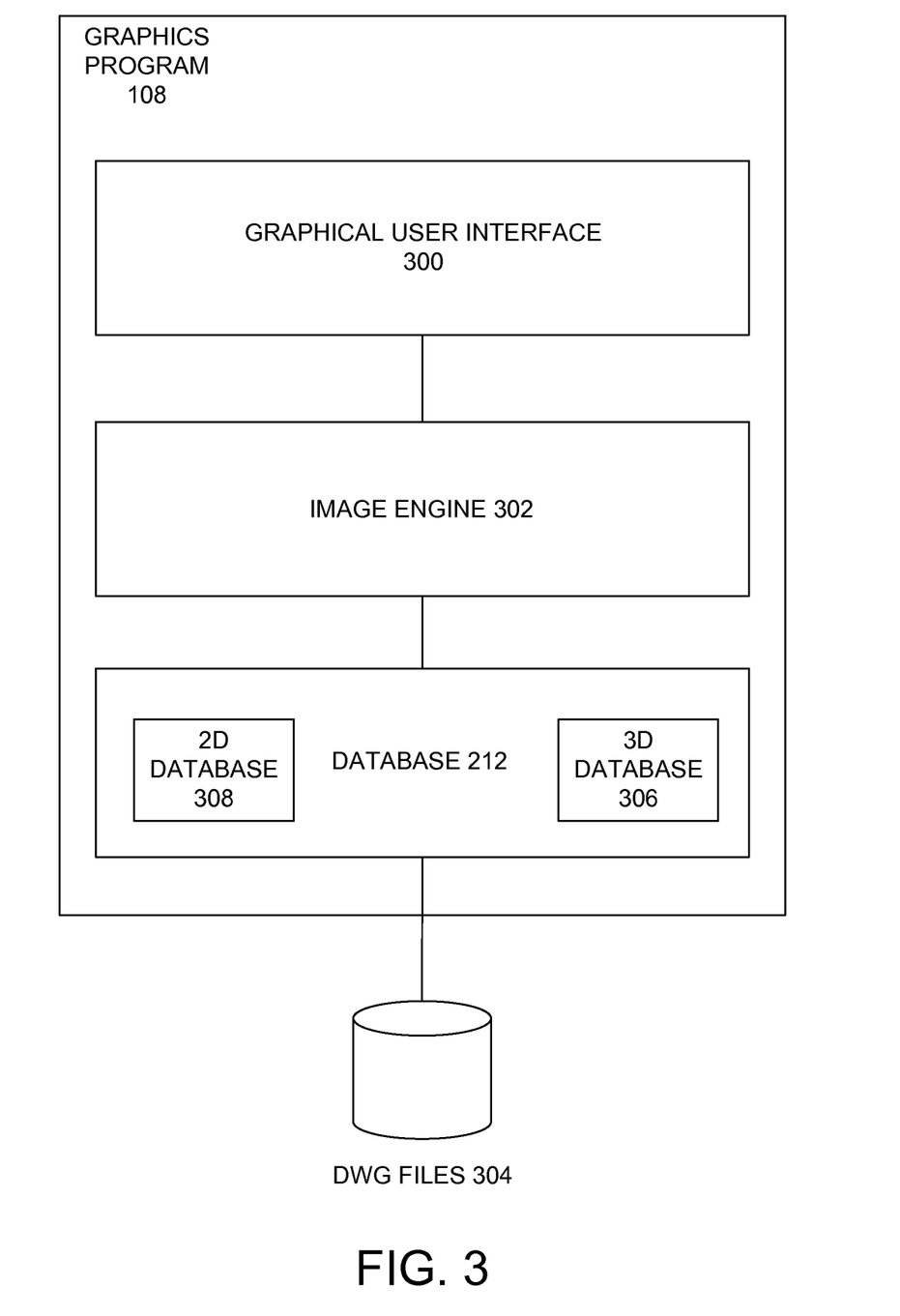
FIG. 3 is a block diagram that illustrates the components of the graphics program of FIG. 2 in accordance with one or more embodiments of the invention.

FIG. 3 is a block diagram that illustrates the components of the graphics program 108 in accordance with one or more embodiments of the invention. There are three main components to the graphics program 108, including: a Graphical User Interface (GUI) 300, an Image Engine (IME) 302, and a DataBase (DB) 212 for storing objects in Drawing (DWG) files 304.

The Graphical User Interface 300 displays information to the operator and provides the functionality for the operator's interaction with the graphics program 108.

The Image Engine 302 processes the DWG files 304 and delivers the resulting graphics to the monitor 102 for display. In one or more embodiments, the Image Engine 302 provides a complete application programming interface (API) that allows other computer programs to interface to the graphics program 108 as needed.

The Database 212 is comprised of two separate types of databases: (1) a 3D database 306 known as the "3D world space" that stores 3D information; and (2) one or more 2D databases 308 known as the "2D view ports" that stores 2D information derived from the 3D information.

As used herein, the graphics program 108 may consist of a variety of different type of applications including GIS, CAD (computer aided design), solid modeling systems, animation products, rendering systems, etc. Embodiments of the invention are not limited to those software applications explicitly described herein but by the limitations set forth in the claims.

Plug-In Modules

Embodiments of the invention provide an architecture and method of using plug-in modules for user defined 3D/4D visualization, analysis, and simulation. Users/clients 100 are provided with the ability to search for, download, and immediately use plug-ins from an online catalog offered by one or more servers 204. These plug-ins can be supplied by software developers and enable users 100 to visualize, analyze, and simulate trends, phenomena, state, and events via software application 108.

Such a plug-in environment allows many different types of applications 108 to load specific data types and allows interaction between those data types. Most "traditional" plug-in environments do not allow this. Plug-ins for different data types may include textures, 3D models, 2D models, particle systems, and geo-based behavior systems (behaviors based on specific geo information).

Another advantage of the plug-in architecture is that it allows user to load models seamlessly without having to go through the lengthy steps of importing files. Accordingly, a full 3D environment and real-time rendering capability of embodiments of the invention combined with the analytic capabilities supplied by a plug-in developer allows user to visualize their data in ways not formerly possible.

Plug-ins are loaded and associated with specific models and scenarios within the digital city of embodiments of the invention. A user can override model and linked data values, enter plug-in parameters, and control the visualization of results. Plug-ins have the ability to automatically add themselves or make calculations based on the data of a particular file making up a digital city environment.

For example, based on GIS fault data, an earthquake preparedness drill particle system could be suggested and/or instantiated. Another example would be a recommended parking configuration based on the number of roads, or total lanes adjacent to a particular structure. Alternatively, a road configuration could be suggested based on the parking structures and parking places in a given city block.

Figure 4:
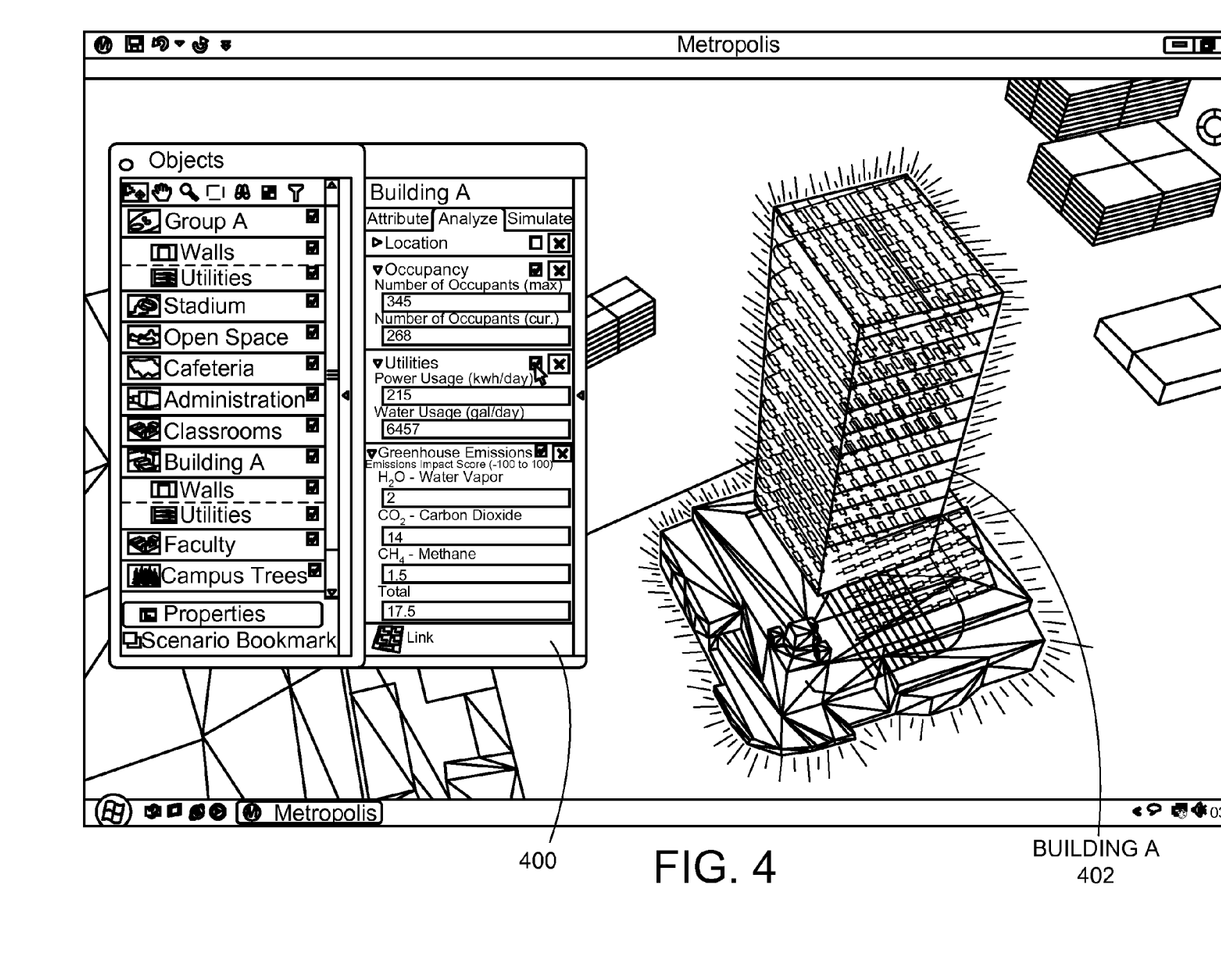
FIG. 4 illustrates an example panel containing multiple plug-ins in accordance with one or more embodiments of the invention.

FIG. 4 illustrates an example panel containing multiple plug-ins. As illustrated, there is a location plug-in, a utilities plug-in, and a greenhouse emissions plug-in. Each plug-in can interact with data established in other plug-ins and use such data in conducting calculations. Panel 400 of FIG. 4 illustrates the resulting display when three plug-ins are utilized together to analyze greenhouse gas emissions based on building occupancy and utility consumption for a selected building in accordance with one or more embodiments of the invention. Panel 400 allows the user to set various options in the various plug-ins for analyzing the green house emissions of building A 402.

Figure 5:
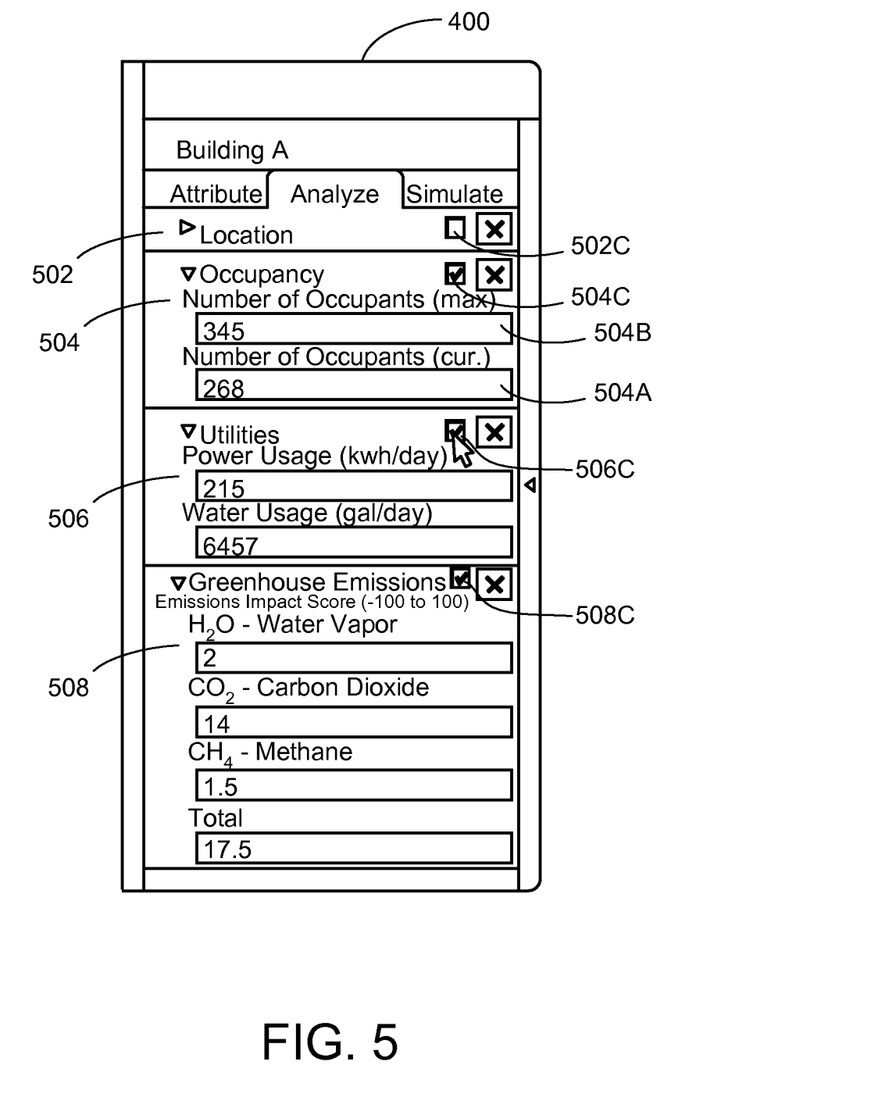
FIG. 5 is an enlargement of a panel of FIG. 4 illustrating several plug-ins available to analyze the currently selected object in accordance with one or more embodiments of the invention.

FIG. 5 is an enlargement of panel 400 of FIG. 4 illustrating several plug-ins available to analyze the currently selected object (i.e., Building A) in accordance with one or more embodiments of the invention.

The location plug-in 502 contains the display and overrides to the geospatial location and position information for the building. In this regard, if location panel 502 were expanded, the user would have the option of specifying where Building A is located. For example, the user can specify the latitude, longitude, and elevation. Alternatively, the user can enter an address (e.g., number, street, city, state, and/or zip, etc.). Further, entering information in one field of the location panel 502 may automatically retrieve and output information in another field (e.g., entry of an address may automatically fill in the corresponding latitude, longitude, and elevation. In addition, once the location information is entered, the object (e.g., Building A 402) would automatically move to the location specified. The resulting visualization from the location plug-in 502 provides a visual representation of Building A 402 in a 3D environment.

The occupancy plug-in 504 allows the user to establish the current number of occupants 504A to be displayed and overrides 504B (i.e., the maximum number of occupants) to the number of occupants for Building A 402. The visualization of the occupancy plug-in 504 would provide for multiple dots indicative of persons in Building A 402 (or distributed throughout building A 402).

The utilities plug-in 506 contains the display and overrides to the utility usage (i.e., water and power) for Building A 402. The visualization of the utilities plug-in results in line or effect simulating power and water usage in Building A 402.

The greenhouse emissions plug-in 508 contains the display and overrides to the LEED (Leadership in Energy and Environmental Design green building rating system) emissions impact score for the Building A 402. The values on greenhouse emissions panel 508 are automatically (i.e., without additional user input) updated based on the occupancy (panel 504) and utility consumption (panel 506) for a selected building. Alternatively, the user may have the options of setting the greenhouse emissions values in panel 508 and the system can automatically adjust either the occupancy values 504 or utility values 506 that are necessary to reach the greenhouse emissions values set forth in panel 508. In this regard, the user can determine which values/panels (502, 504, 506, and 508) are locked and which can be adjusted depending on the values specified in the other panels. The visualization of greenhouse emissions plug-in 508 would result in a halo type effect displayed around and emanating from Building A 402.

Accordingly, developers and plug-in authors can harness to the full power of 3D rendering to convey the results of their calculations. In this regard, the 3D simulation illustrated in FIG. 4 may change its coloring or areas displayed based on the visualizations resulting from plug-ins 402-508. Check boxes 502C-508C may be utilized to determine whether a resulting visualization for the respective plug-in 502-508 is displayed in the 3D rendering of FIG. 4. For example, the user may check boxes (e.g., check boxes 502C, 504C, 506C, and 508C) within panel 400 to determine which plug-ins will be reflected in the display of building A 402 of FIG. 4. This allows users to visualize and analyze their data in new and powerful ways.

One or more embodiments of the invention use plug-ins to create animations that simulate results over time (4D). In addition, plug-ins can be used to simulate human behavior in the 3D environment. Given some human interaction and a stimulus in that environment, the plug-in architecture allows a user to predict and visualize certain human behaviors. The architecture also allows the user to visualize different temporal simulations like the sun and moon, weather patterns and phenomena such as tornadoes and snowfall (see detailed examples below).

Visual Bookmarking

One or more embodiments of the invention all the user to define scenarios that incorporate specific model and linked data overrides, plug-ins and their settings, and visualization traits. In other words, a group of settings are stored into a type of visual "bookmark" that allows the user to define specific "what-if" scenarios. Each scenario or "bookmark" captures specific model and linked data overrides supplied by the user, a set of plug-ins and their settings, and visualization parameters and traits.

By bookmarking scenarios and sub-scenarios with different settings, the user can quickly compare and analyze their information and make informed decisions. This essentially allows a user to save certain data sets, apply them to scenes <environments, geoviews>, recall them and compare and contrast. In the prior art, to visualize and compare different scenarios, the users were required to modify a file, save it with a certain criteria, render it and repeat the process for each different scenario and comparing the final renderings. The ability to store the various settings into a bookmark is faster and interactive so the user is not required to save files using different settings.

Figure 6:
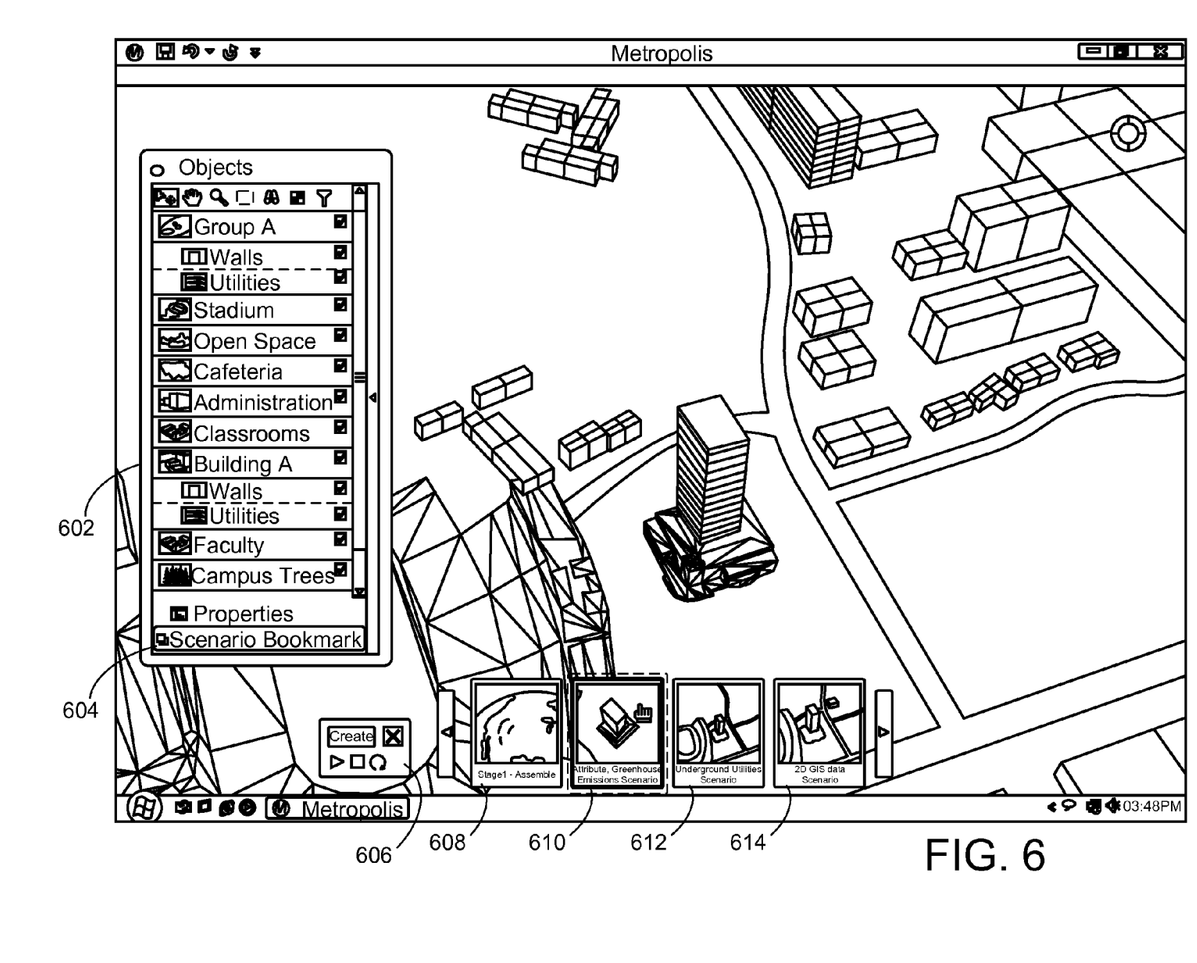
FIG. 6 illustrates various bookmarked scenarios that are selectable by a user in accordance with one or more embodiments of the invention.

FIG. 6 illustrates various bookmarked scenarios that are selectable by a user in accordance with one or more embodiments of the invention. The user first establishes all of the desired settings by selecting a particular data set, plug-ins and their settings, properties, data overrides, visualization traits, etc. in dialog box 602. Such values may be entered directly or can be linked by establishing a link between a property and an external file (e.g., a spreadsheet that contains values).

Alternatively, the user can select the scenario bookmark 604 in panel 602 which allows the user to select a set of predefined settings. Once the desired properties for a bookmark have been established (i.e., in dialog box/panel 602), the user can opt to create a bookmark to associate all of the settings with a bookmark, placeholder, or thumbnail for those settings using dialog box 606. Once created and if in the appropriate mode, the user may be presented with a group of selectable icons or menu options representative of the various bookmarks that have been established. For example, icons 608, 610, 612, and 614 are representative of various bookmarked scenarios that have been established by a user. Thus, each scenario represented by bookmarked icons 608-614 provides a selection of one or more plug-ins, and properties/settings that permit the user to define a particular visualization in a 3D/4D environment.

In view of the above, bookmarked scenarios can be viewed as a way of storing both a set of data (a specific set of models that have been loaded into a server) into a name, a set, with a series of plug-ins and potentially some overriding information for those plug-ins.

Logical Flow

Figure 7:
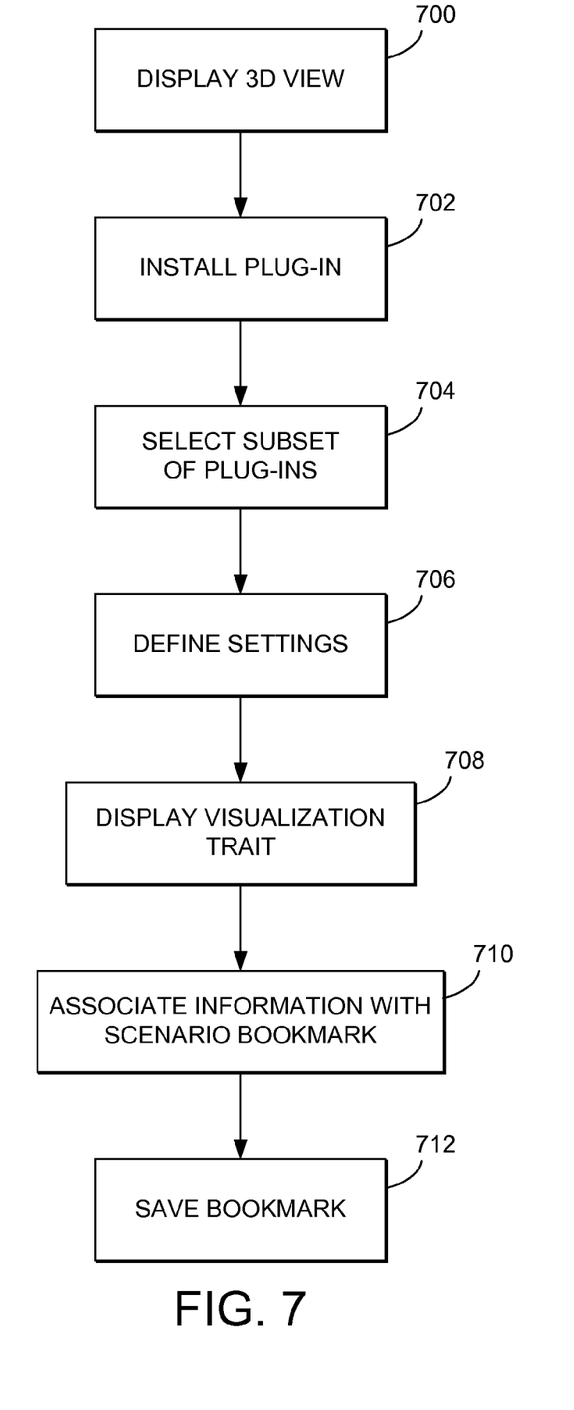
FIG. 7 illustrates the logical flow for storing user defined scenarios in a three-dimensional system in accordance with one or more embodiments of the invention.

FIG. 7 illustrates the logical flow for storing user defined scenarios in a three-dimensional system in accordance with one or more embodiments of the invention.

At step 700, a three-dimensional (3D) view of a real world scene is displayed on a display device using a 3D graphics application.

At step 702, one or more plug-ins are installed into the 3D graphics application. The plug-ins may be viewed as an application that enables a user to visualize, analyze, and simulate a particular user-defined scenario in the 3D view.

At step 704, input is received from a user selecting a subset of the one or more plug-ins.

At step 706, input is received from a user defining one or more settings for the subset of plug-ins. As described above, such settings may include particular calculations or values that are specified.

At step 708, input is received from the user defining a visualization trait for each plug-in in the subset of plug-ins. In other words, the user specifies whether the visualization for the plug-in should be displayed in the 3D view. Steps 706 and 708 may further include receiving additional input from the user defining a linked data override. Such a linked data override may consist of a link to an external file that contains values for the one or more settings.

At step 710, input is received from the user associating an identification of the selected subset of plug-ins, the one or more settings, and the visualization trait with a scenario bookmark. If a linked data override is specified as part of steps 706 and 708, such a linked data override is also including the association of the information with the scenario bookmark at step 710.

At step 712, input is received from the user saving the scenario bookmark such that a user can select the saved scenario bookmark and display a visualization of a scenario based on the selected set of plug-ins, one or more settings, and the visualization trait for each plug-in in the subset. Such saving of the scenario bookmark may be to persistent storage (e.g., a hard drive, compact disk, digital video disk [DVD], etc.). Accordingly, based on the stored/saved scenario bookmark, the user has the option of later selecting the bookmark and displaying a visualization based on all of the information and settings contained in the bookmark. Such a visualization represents a particular scenario defined by the user based on the information in the bookmark.

Step 712 may further include the displaying of multiple scenario bookmarks on a display device that the user can dynamically select from. Such a scenario bookmark(s) may be displayed in the form of a thumbnail icon. Thus, multiple thumbnails may be displayed (e.g., as illustrated in FIG. 6), and the user can elect to quickly, dynamically, and easily view a particular scenario that the user (or another user) has defined. Such a capability allows the user to easily compare and contrast different scenarios as desired.

CONCLUSION

This concludes the description of the preferred embodiment of the invention. The following describes some alternative embodiments for accomplishing the present invention. For example, any type of computer, such as a mainframe, minicomputer, or personal computer, or computer configuration, such as a timesharing mainframe, local area network, or standalone personal computer, could be used with the present invention.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A computer implemented method for storing user defined scenarios in a three-dimensional system, comprising:

displaying, using a three-dimensional (3D) geospatial environment provided by a 3D graphics application, a 3D view of 3D model of a real world scene on a display device, wherein the 3D model comprises one or more objects that correspond to one or more real world objects in the real world scene;

installing two or more plug-ins into the 3D graphics application, wherein each of the plug-ins is used to define a user defined environmental simulated visual rendering of one or more of the objects that have been selected, in the 3D view of the real world scene, wherein the user defined environment simulated visual rendering simulates a trend, phenomena, state, or event resulting from an application of a visualization trait for each plug-in and one or more settings defined by input from a user to the 3D model of the real world scene;

receiving the input from the user selecting a subset comprising two or more of the two or more plug-ins;

receiving input from a user defining one or more settings for the subset of plug-ins;

receiving input from the user defining a visualization trait for each plug-in in the subset of plug-ins, wherein each visualization trait determines whether a visualization for the respective plug-in is to be displayed;

receiving input from the user associating an identification of the selected subset of plug-ins, the one or more settings, and the visualization traits for the selected subset of plug-ins with a scenario bookmark;

receiving input from the user saving the scenario bookmark;

selecting the saved scenario bookmark; and displaying a scenario visualization of a scenario based on the selected set of plug-ins, one or more settings, and the visualization traits for each plug-in in the subset.

2. The method of claim 1, further comprising:

receiving input from the user defining a linked data override; and receiving input from the user associating the linked data override with the bookmark.

3. The method of claim 2, wherein the linked data override comprises a link to an external file that contains values for the one or more settings.

4. The method of claim 1, further comprising displaying multiple scenario bookmarks on a display device that the user can select.

5. The method of claim 1, wherein the scenario bookmark is displayed in a thumbnail icon on the display device.

6. The method of claim 1, wherein at least one of the two or more plug-ins comprises an application that enables a user to visualize, analyze, and simulate a human behavior within the 3D view.

7. The method of claim 1, wherein:

each plug-in interacts with data established in other plug-ins; and each plug-in uses such data in conducting calculations.

8. The method of claim 1 wherein visualizations, for all plug-ins having visualization traits indicating the respective plug-in is to be displayed, are displayed simultaneously.

9. An apparatus for storing user defined scenarios in a three-dimensional system in a computer system comprising:

(a) a computer having a memory;

(b) an application executing on the computer, wherein the application is configured to:

(i) display, using a three-dimensional (3D) geospatial environment provided by a 3D graphics application, a 3D view of a 3D model of a real world scene on a display device, wherein the 3D model comprises one or more objects that correspond to one or more real world objects in the real world scene;

(ii) install two or more plug-ins into the 3D graphics application, wherein each of the plug-ins is used to define a user defined environmental simulated visual rendering of one or more of the objects that have been selected, in the 3D view of the real world scene, wherein the user defined environment simulated visual rendering simulates a trend, phenomena, state, or event resulting from an application of a visualization trait for each plug-in and one or more settings defined by input from a user to the 3D model of the real world scene;

(iii) receive input from a user selecting a subset comprising two or more of the two or more plug-ins;

(iv) receive input from a user defining one or more settings for the subset of plug-ins;

(v) receive input from the user defining a visualization trait for each plug-in in the subset of plug-ins, wherein each visualization trait determines whether a visualization for the respective plug-in is to be displayed;

(vi) receive input from the user associating an identification of the selected subset of plug-ins, the one or more settings, and the visualization traits for the selected subset of plug-ins with a scenario bookmark;

(vii) receive input from the user saving the scenario bookmark;

(viii) select the saved scenario bookmark; and (ix) display a scenario visualization of a scenario based on the selected set of plug-ins, one or more settings, and the visualization traits for each plug-in in the subset.

10. The apparatus of claim 9, further comprising:

receiving input from the user defining a linked data override; and receiving input from the user associating the linked data override with the bookmark.

11. The apparatus of claim 10, wherein the linked data override comprises a link to an external file that contains values for the one or more settings.

12. The apparatus of claim 10, wherein:

each plug-in interacts with data established in other plug-ins; and each plug-in uses such data in conducting calculations.

13. The apparatus of claim 10, wherein visualizations, for all plug-ins having visualization traits indicating the respective plug-in is to be displayed, are displayed simultaneously.

14. The apparatus of claim 9, further comprising displaying multiple icons representing different scenario bookmarks on a display device that the user can select.

15. The apparatus of claim 9, wherein the scenario bookmark is displayed in a thumbnail icon on the display device.

16. The apparatus of claim 9, wherein at least one of the two or more plug-ins comprises an application that enables a user to visualize, analyze, and simulate a human behavior within the 3D view.

17. An article of manufacture comprising a non-transient program storage device readable by a computer, tangibly embodying at least one program of instructions executable by the computer to perform method steps of storing user defined scenarios in a three-dimensional system, the method steps comprising the steps of:

displaying, using a three-dimensional (3D) geospatial environment provided by a 3D graphics application, a 3D view of a 3D model of a real world scene on a display device, wherein the 3D model comprises one or more objects that correspond to one or more real world objects in the real world scene;

installing two or more plug-ins into the 3D graphics application, wherein each of the plug-ins is used to define a user defined environmental simulated visual rendering of one or more of the objects that have been selected, in the 3D view of the real world scene, wherein the user defined environment simulated visual rendering simulates a trend, phenomena, state, or event resulting from an application of a visualization trait for each plug-in and one or more settings defined by input from a user to the 3D model of the real world scene;

receiving input from a user selecting a subset comprising two or more of the two or more plug-ins;

receiving input from a user defining one or more settings for the subset of plug-ins;

receiving input from the user defining a visualization trait for each plug-in in the subset of plug-ins, wherein each visualization trait determines whether a visualization for the respective plug-in is to be displayed;

receiving input from the user associating an identification of the selected subset of plug-ins, the one or more settings, and the visualization traits for the selected subset of plug-ins with a scenario bookmark;

receiving input from the user saving the scenario bookmark;

selecting the saved scenario bookmark; and displaying a scenario visualization of a scenario based on the selected set of plug-ins, one or more settings, and the visualization traits for each plug-in in the subset.

18. The article of manufacture of claim 17, further comprising:
receiving input from the user defining a linked data override; and
receiving input from the user associating the linked data override with the bookmark.

19. The article of manufacture of claim 18, wherein the linked data override comprises a link to an external file that contains values for the one or more settings.

20. The article of manufacture of claim 17, further comprising displaying multiple scenario bookmarks on a display device that the user can select.

21. The article of manufacture of claim 17, wherein the scenario bookmark is displayed in a thumbnail icon on the display device.

22. The article of manufacture of claim 17, wherein at least one of the two or more plug-ins comprises an application that enables a user to visualize, analyze, and simulate a human behavior within the 3D view.

23. The article of manufacture of claim 17, wherein:
each plug-in interacts with data established in other plug-ins; and
each plug-in uses such data in conducting calculations.

24. The article of manufacture of claim 17, wherein visualizations, for all plug-ins having visualization traits indicating the respective plug-in is to be displayed, are displayed simultaneously.

* * * * *